(12) United States Patent
Winey et al.

(10) Patent No.: US 7,148,269 B2
(45) Date of Patent: Dec. 12, 2006

(54) INTERFACIAL POLYMER INCORPORATION OF NANOTUBES

(75) Inventors: Karen I. Winey, Philadelphia, PA (US); Reto Haggenmueller, Philadelphia, PA (US); Fangming Du, Upper Darby, PA (US)

(73) Assignee: Trustees of the University of Pennsylvania, Philadelphia, PA (US)

( * ) Notice: Subject to any disclaimer, the term of this patent is extended or adjusted under 35 U.S.C. 154(b) by 350 days.

(21) Appl. No.: 10/386,214

(22) Filed: Mar. 11, 2003

(65) Prior Publication Data

US 2003/0180526 A1  Sep. 25, 2003

Related U.S. Application Data

(60) Provisional application No. 60/363,650, filed on Mar. 11, 2002.

(51) Int. Cl.
   *C09J 9/32* (2006.01)
   *C08K 3/34* (2006.01)

(52) U.S. Cl. ............. 523/218; 523/205; 523/215; 524/404; 524/496; 524/602; 528/336; 428/367; 977/DIG. 1

(58) Field of Classification Search ......... 523/218, 523/205, 215; 524/404, 496, 602; 528/336; 428/367
   See application file for complete search history.

(56) References Cited

U.S. PATENT DOCUMENTS

| | | | | |
|---|---|---|---|---|
| 3,429,650 A | * | 2/1969 | Wasley et al. ........ | 8/115.6 |
| 6,159,502 A | * | 12/2000 | Russell-Jones et al. ..... | 424/489 |
| 6,426,134 B1 | | 7/2002 | Lavin et al. ............ | 428/300.1 |
| 6,723,299 B1 | * | 4/2004 | Chen et al. ............. | 423/447.1 |
| 6,872,403 B1 | * | 3/2005 | Pienkowski et al. ....... | 424/422 |
| 2002/0046872 A1 | | 4/2002 | Smalley et al. .......... | 174/137 |
| 2002/0048631 A1 | | 4/2002 | Kamijima ............... | 427/128 |
| 2003/0089893 A1 | * | 5/2003 | Niu et al. .............. | 252/500 |
| 2003/0158323 A1 | * | 8/2003 | Connell et al. .......... | 524/495 |
| 2004/0079892 A1 | * | 4/2004 | Schneiker et al. ........ | 250/423 F |

OTHER PUBLICATIONS

Jian Chen, Mark A. Hamon, Hui Hu, Yongsheng Chen, Apparao M. Rao, Peter C. Eklund, Robert C. Haddon; "Solution Properties of Single-Walled Carbon Nanotubes"; Science, vol. 282, Oct. 2, 1998; pp. 95-98.

Ron Dagani; Materials Chemistry—Stir, Heat—But no Need to Dissolve; Chemical & Engineering News of the Week, Feb. 3, 2003; p. 5.

* cited by examiner

*Primary Examiner*—Tae H. Yoon
(74) *Attorney, Agent, or Firm*—RatnerPrestia

(57) ABSTRACT

A method for producing a composite material containing nanotubes and an interfacial polymer, and a composite material made by the method. The method involves contacting two mutually insoluble monomer solutions, at least one of which contains nanotubes, to provide an insoluble polymer containing entrained nanotubes.

14 Claims, No Drawings

INTERFACIAL POLYMER INCORPORATION OF NANOTUBES

CROSS REFERENCE TO RELATED APPLICATIONS

This patent application claims priority to U.S. Provisional Patent Application No. 60/363,650, filed Mar. 11, 2002.

FIELD OF THE INVENTION

The present invention relates to a method for preparing composite materials comprising nanostructures and polymers. These composite materials have enhanced thermal and electronic properties and high mechanical stiffness. The invention also relates to composite materials prepared by the method of this invention.

BACKGROUND OF THE INVENTION

Conventional thermally conductive composites contain high thermal conductivity particle fillers in a matrix. In these conventional composites, particle fillers such as alumina, metal powders, and boron nitride are added to materials such as silicone rubber, polyamide, and polyester. Particle filler content is typically very high, 50% or even higher. The resulting composite materials have thermal conductivities on the order of 5 W/m-K.

The development of the high-pressure carbon monoxide (HiPCO) process of fabricating nanotube materials allows production of 1 gram/hour of single-wall nanotube (SWNT), inviting nanotube applications requiring industrial quantities. It is expected that good thermal conductivity, electrical conductivity, and/or mechanical stiffness can be realized by proper incorporation of nanotubes in polymer composites.

Nanostructures, such as single-wall carbon nanotubes (SWNT), are extremely promising for enhanced stiffness in mechanical composites, as they provide a high Young's modulus and strength-to-weight ratio. Such lightweight and strong polymers are expected to find considerable utility in the automobile and aerospace industries, among others. Also, because phonons dominate thermal transport at all temperatures in nanotube materials, nanostructures appear ideal for high-performance thermal management.

Similarly, epoxy resin-nanotube compositions have been prepared with the hope of obtaining composites of high mechanical strength. However, nanotube-epoxy composites previously manufactured have typically been weaker or only slightly stronger than the pristine epoxy (Vaccarini et al. Proceedings of the XIV International Winterschool, p.521; 2000; Ajayan et al. Advanced Materials 12, p.750; 2000; and Schadler et al. Appl. Phys. Lett., 73, p.3842; 1998). Enhanced strength has been observed in SWNT-PMMA (polymethyl methacrylate) composites (Haggenmueller et al. Chem. Phys. Lett. 330, p.219; 2000); however the composites did not display the enhanced stiffness predicted by simple models of polymer/nanotube composites. Thus, despite the great promise of nanotube composites, the properties obtained to date have not met their apparent potential. One possible factor contributing to this disappointing performance is poor dispersion of the nanotubes in the polymer matrix.

There continues to be a need for methods of incorporating well-dispersed nanotubes into polymeric materials to provide composites having good thermal, electrical, and/or mechanical properties.

SUMMARY OF THE INVENTION

In one aspect, the invention is a method for making a composite material comprising nanotubes dispersed in a polymer. The method comprises providing a first monomer mixture comprising a first monomer in a first solvent; providing a second monomer mixture comprising a second monomer in a second solvent that is substantially insoluble in the first solvent, one or both of the first and second monomer mixtures further comprising nanotubes; and contacting the first and second monomer mixtures to form a polymer that is insoluble in both the first solvent and the second solvent, whereby at least a portion of the nanotubes is entrained in the polymer, thereby forming the composite material.

In another aspect, the invention is a composite material comprising nanotubes dispersed in a polymer. The composite material is made by a method that comprises providing a first monomer mixture comprising a first monomer in a first solvent; providing a second monomer mixture comprising a second monomer in a second solvent that is substantially insoluble in the first solvent, one or both of the first and second monomer mixtures further comprising nanotubes; and contacting the first and second monomer mixtures to form a polymer that is insoluble in both the first solvent and the second solvent, whereby at least a portion of the nanotubes is entrained in the polymer, thereby forming the composite material.

DETAILED DESCRIPTION OF THE INVENTION

The invention will next be illustrated with reference to certain specific, exemplary embodiments. Such exemplary embodiments are intended to be illustrative rather than exhaustive, and are included herewith to facilitate the explanation of the present invention, and should not be construed to limit the scope of the invention as set forth in the claims.

The invention involves the interfacial polymerization of two or more monomers in the presence of nanotubes that have been dispersed in one or both of the solvents used for the polymerization. As used hereinafter, the terms "disperse" or "dispersed" mean distribution of a material throughout a medium, and includes dissolution of that material in the medium. In the process of polymerization, at least a portion of the nanotubes is entrained in the polymer, providing a composite material.

Interfacial polymers suitable for use in making composite materials according to the invention include any polymer that can be made by this method. Interfacial polymerization is an alternative to homogeneous polymerization of condensation polymers. In interfacial polymerization, two substantially mutually insoluble solvents are used, with monomer in one solvent reacting with monomer in the other solvent. Typically, one of the solvents is water and the other is an organic solvent that is insoluble in water. The polymerization takes place at the interface between these layers, and results in a polymer that is insoluble in either solvent.

One exemplary class of interfacial polymers suitable for making composite materials according to the invention is the nylon family, including nylon 10,12; nylon 6,12; nylon 6,10; and nylon 6,6. The preparation of nylons by interfacial polymerization is well known in the polymer art, and involves dissolving a diacid chloride such as adipoyl chloride in an organic solvent such as benzene or toluene (others may be used), and dissolving a diamine such as hexamethylenediamine in water. Other exemplary diacid chlorides include sebacoyl chloride and dodecanedioyl dichloride. Other exemplary diamines include decamethylenediamine. The reaction may be done with excess diamine to counteract the acidity of the HCl that is produced by the reaction, or it may be performed in the presence of another base, for example sodium hydroxide.

The two solutions are mutually insoluble, with the less dense phase (typically the organic solvent, when the other solvent is water) on top. The diacid chloride and the diamine react upon contact at room temperature without an initiator or a catalyst. The monomers meet at the interface between the two phases and polymerize to form a film of polyamide, for example nylon 6,6. On a laboratory scale, for example, the polyamide film can be lifted as a "rope" with a pair of tweezers out of the reaction vessel, so as to continuously replenish the interface for the two monomers to meet and react, thereby continuing the polymerization process. Alternatively, the reaction may be performed in the presence of strong agitation, to increase the interfacial surface area between the two liquid phases and thereby increase the reaction rate. Any agitation means may be suitable, with one example being a high-shear mixer such as a kitchen blender or similar device.

According to the invention, one or more varieties of nanotube is dispersed in the organic phase or the aqueous phase, or both of these, prior to combining these phases to produce the polymer. In one exemplary embodiment of the invention, HiPCO (and/or other varieties of) carbon nanotubes are dispersed in the aqueous phase in the presence of a surfactant, one nonlimiting example of which is sold by Dow Chemical of Midland, Mich. under the name Triton™-X100. (As used hereinafter, the term "HiPCO" is intended to refer to carbon nanotubes made by the high-pressure carbon monoxide process.) The dispersion may be performed with the aid of sonication, which helps to reduce the particle size of the nanotubes and improve their dispersion in composite material. The sonication may be performed either in the presence of the diamine and/or any added base such as sodium hydroxide, or it may be performed prior to the addition of either or both of these materials to the aqueous nanotube mixture.

In another exemplary embodiment of the invention, nanotubes are dispersed in a solvent such as toluene. The dispersion may be performed with the aid of sonication, and the sonication may be performed either in the presence of the diacid chloride, or it may be performed prior to addition of the diacid chloride to the solvent/nanotube mixture. Alternatively, the nanotubes may be dispersed in both liquid phases.

In another exemplary embodiment of the invention, composite materials comprising nanotubes are prepared from carbon nanotubes that have, in a preliminary step, been functionalized with chemical groups that provide improved dispersion and distribution of the nanotubes in the composite material. One example of such functionalization involves the covalent attachment of organic moieties to at least a majority of the nanotubes. One method for doing this is described by J. Chen et al. in Science, 282, 95 (1998). This method involves the treatment of SWNT with nitric acid, leaving carboxylic acid groups on the nanotubes. The carboxylic acid groups are converted to acid chloride groups by reaction with thionyl chloride, and these groups are in turn caused to react with an organic amine to form amide groups bonded to the nanotubes.

Examples of suitable amines are 1-dodecylamine and 1-octadecylamine. Other amines may be used alternatively or in addition, and may include for example $C_4$ to $C_{20}$ aliphatic amines, especially those based on straight chain hydrocarbons. Primary amines may be used, or the amines may be secondary amines. Also suitable are aryl-substituted alkyl amines, including for example phenethylamine, 3-phenylpropylamine, and 4-phenylbutylamine. The skilled artisan will appreciate that the best amine to use will depend upon a variety of factors, including the solvents used for the preparation of the interfacial polymer, and the chemical structure of the polymer. The optimization of such parameters is within the ability of the skilled artisan, and can be performed using routine experimentation.

As a result of functionalizing the nanotubes, improved dispersion of nanotubes in solvents, as well as ultimately in composites, can be obtained. One way of indicating improved dispersion of nanotubes is by the appearance of the mixture. If the continuous phase in which the nanotubes are dispersed is otherwise optically clear, the degree of dispersion is qualitatively indicated by the clarity of the resulting dispersion. Better-dispersed nanotubes result in a dispersion that is clear, or at least clearer than when the dispersion is not as good, and has fewer black flecks or other visible particles.

In another exemplary embodiment of the invention, composite materials may be prepared using boron nitride nanotubes (BNNT), double-wall carbon nanotubes (DWNT), multiwall carbon nanotubes (MWNT), or any of these in combination with each other or with SWNT.

The relative proportions of nanotubes and polymer in composite materials made according to the invention may vary over a considerable range, depending inter alia upon the type of nanotube used, the type of interfacial polymer used, and the desired application of the resulting composite material. Similarly, the concentrations of monomer used in the interfacial polymerizations employed in the practice of this invention may vary, according to variations in these same parameters, the choice of solvent, and possibly other parameters. In the case of nylon 6,6 composites made with HiPCO carbon nanotubes functionalized as described above with dodecylamine or octadecylamine, the concentration of adipoyl chloride in toluene may typically range between about 0.5 and 5 vol. %, more preferably between about 1 and 1.5 vol. %. The concentration of hexamethylenediamine in water may range between about 0.4 and 1 vol. %, more preferably about 0.5 vol. %. The combined weight of nanotubes charged to the toluene phase and/or the aqueous phase may range between about 0.005% and about 25%, more preferably about 0.05% and 7.5%, based on the combined weight of the two monomers. The percentage of nanotubes by weight in the resulting composite material typically ranges between about 0.01% and about 50%, more preferably between about 0.1% and 15%. It is typical, but not necessary, that substantially all of the nanotubes are captured in the composite material that is formed. Typically, conversion of the monomers to polymer is about 50%, but the percent conversion may be essentially any value up to 100% according to the invention.

EXAMPLES

Example 1

HiPCO Functionalization with $C_{18}$ Chains

A 200-mg portion of unpurified HiPCO carbon nanotubes (HRR87 soot, carbon nanotube from Rice Univ.; batch 87) was refluxed in 40 mL of 2.6M nitric acid for 48 hours at 115° C. The mixture was cooled and washed several times with water, and the HiPCO-COOH was collected on a 2-μm polycarbonate filter membrane. The HiPCO-COOH was dried at room temperature under vacuum. A 100-mg sample of the HiPCO-COOH was dispersed in 3 mL of dimethyl formamide (DMF), sonicated for several hours, and then added to 25 mL of $SOCl_2$. The mixture was refluxed at 70° C. for 24 hours, cooled down, and the nanotubes were collected on a 1-μm PTFE filter membrane, washing with anhydrous tetrahydrofuran. The remaining solid was dried at room temperature under vacuum. Although in this example the drying was performed until essentially all of the tetrahydrofuran was removed, it may in general be beneficial for ease of subsequent nanotube dispersion to leave a small amount of solvent with the nanotubes.

The resulting HiPCO-COCl was mixed with 4 g of octadecylamine and the mixture was heated at 95° C. for 96 hours. After cooling the reaction mixture down, unreacted octadecylamine was removed by washing with acetone. The resulting $C_{18}$-HiPCO was dispersed in toluene and filtered with a 2-μm polycarbonate membrane to remove agglomerated nanotubes, with the filtrate containing the $C_{18}$-HiPCO. The filtrate was nearly clear and had a slight brown tint, indicating that the particle size of the suspended nanotubes had been substantially reduced.

Example 2

HiPCO Functionalization with $C_{12}$ Chains

A 200-mg portion of unpurified HiPCO (HRR87 soot, carbon nanotube from Rice Univ.; batch 87) was refluxed in 40 mL of 2.6M nitric acid for 48 hours at 115° C. The mixture was cooled and washed several times with water, and the HiPCO-COOH was collected on a 2-μm polycarbonate filter membrane. The HiPCO-COOH was dried at room temperature under vacuum. A 100-mg sample of the HiPCO-COOH was dispersed in 3 mL of dimethyl formamide (DMF), sonicated for several hours, and then added to 25 mL of $SOCl_2$. The mixture was refluxed at 70° C. for 24 hours, cooled down, and the nanotubes were collected on a 1-μm PTFE filter membrane, washing with anhydrous tetrahydrofuran. The remaining solid was dried at room temperature under vacuum.

The resulting HiPCO-COCl was mixed with 4 g of dodecylamine and the mixture was heated at 95° C. for 96 hours. After cooling the reaction mixture down, unreacted dodecylamine was removed by washing with acetone. The resulting $C_{12}$-HiPCO was dispersed in toluene, and the resulting mixture was slightly hazy, indicating that the particle size of the suspended nanotubes had been substantially reduced.

Example 3

In Situ Polymerization with Purified HiPCO

An aqueous solution of 2.0 g of hexamethylenediamine and 1.5 g of NaOH was dissolved in 300 mL of water, and precooled in a laboratory refrigerator for 4 hours. A 125-mg sample of purified HiPCO (purified HRR87 carbon nanotube from Rice Univ.; batch 87) was dispersed in 150 mL of toluene, sonicated for 12 hours at a frequency of 40 kHz and a power level of 50% using a bath ultrasonicator model Ultrasonik 57X, available from Neytech of Bloomfield, Conn., and sonicated for an additional 3 hours in ice water. A 2.5-ml portion of adipoyl chloride was added to the HRR87 (purified)/toluene suspension just before polymerization.

The aqueous hexamethylenediamine solution was added to a blender (precooled in a laboratory refrigerator for 4 hours), the blender was started, and the HiPCO/toluene/ adipoyl chloride mixture was added to the blender over about 30 seconds. The mixture was agitated for 5 minutes at maximum agitation, to provide a nylon 6,6/HiPCO composite slurry.

The composite was collected by filtration on a Büchner fritted disk funnel, washed twice with 250 mL deionized water in the blender, collected by filtration, and washed two times with 250 mL of acetone in the blender. The solid composite was filtered and dried in a vacuum oven at 100° C. for 12 hours to yield approximately 2.5 g of composite having 5 wt. % of HiPCO.

Example 4

In Situ Polymerization $C_{12}$-HiPCO

An aqueous solution of 2.0 g of hexamethylenediamine and 1.5 g of NaOH was dissolved in 300 mL of water, and precooled in a laboratory refrigerator for 4 hours. A 171-mg sample of $C_{12}$-HiPCO (73% HiPCO content) was dispersed in 150 mL of toluene, sonicated for 12 hours under the conditions described in Example 3, and sonicated for an additional 3 hours in ice water. A 2.5-ml portion of adipoyl chloride was added to the $C_{12}$-HiPCO/toluene suspension just before polymerization.

The aqueous hexamethylenediamine solution was added to a blender (precooled in a laboratory refrigerator for 4 hours), the blender was started, and the $C_{12}$-HiPCO/toluene/ adipoyl chloride mixture was added to the blender over about 30 seconds. The mixture was agitated for 5 minutes at maximum agitation, to provide a nylon 6,6/$C_{12}$-HiPCO composite slurry.

The composite was collected by filtration on a Büchner fritted disk funnel, washed twice with 250 mL deionized water in the blender, collected by filtration, and washed two times with 250 mL of acetone in the blender. The solid composite was filtered and dried in a vacuum oven at 100° C. for 12 hours to yield approximately 2.5 g of composite having 5 wt. % of $C_{12}$-HiPCO (weight of HiPCO only, not including alkyl chain weight).

Example 5

In Situ Polymerization $C_{18}$-HiPCO

An aqueous solution of 2.0 g of hexamethylenediamine and 1.5 g of NaOH was dissolved in 300 mL of water, and precooled in a laboratory refrigerator for 4 hours. A 227-mg sample of $C_{18}$-HiPCO (55% HiPCO content) was dispersed in 150 mL of toluene, sonicated for 12 hours under the conditions described in Example 3, and sonicated for an additional 3 hours in ice water. A 2.5-ml portion of adipoyl chloride was added to the $C_{18}$-HiPCO/toluene suspension just before polymerization.

The aqueous hexamethylenediamine solution was added to a blender (precooled in a laboratory refrigerator for 4 hours), the blender was started, and the $C_{18}$-HiPCO/toluene/ adipoyl chloride mixture was added to the blender over about 30 seconds. The mixture was agitated for 5 minutes at maximum agitation, to provide a nylon 6,6/$C_{18}$-HiPCO composite slurry.

The composite was collected by filtration on a Büchner fritted disk funnel, washed twice with 250 mL deionized water in the blender, collected by filtration, and washed two times with 250 mL of acetone in the blender. The solid composite was filtered and dried in a vacuum oven at 100° C. for 12 hours to yield approximately 2.5 g of composite having 5 wt. % of $C_{18}$-HiPCO (weight of HiPCO only, not including alkyl chain weight).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for making a composite material comprising nanotubes dispersed in a polymer, the method comprising:
   providing a first monomer mixture comprising a first monomer in a first solvent;
   providing a second monomer mixture comprising a second monomer in a second solvent that is substantially insoluble in the first solvent, one or both of the first and second monomer mixtures further comprising nanotubes; and
   contacting the first and second monomer mixtures to form a condensation polymer, the polymer insoluble in both of the first solvent and the second solvent, whereby at least a portion of the nanotubes is entrained in the polymer, thereby forming the composite material.

2. The method of claim 1, wherein the first monomer comprises a diamine and the second monomer comprises a diacid chloride.

3. The method of claim 1, wherein the first monomer comprises hexamethylenediamine and the second monomer comprises adipoyl chloride.

4. The method of claim 1, wherein the first monomer comprises hexamethylenediamine and the second monomer comprises sebacoyl chloride.

5. The method of claim 1, wherein the first monomer comprises hexamethylenediamine and the second monomer comprises dodecanedioyl dichloride.

6. The method of claim 1, wherein the first monomer comprises decamethylenediamine and the second monomer comprises dodecanedioyl dichloride.

7. The method of claim 1, wherein the first monomer comprises a diamine and the first monomer mixture comprises the nanotubes, the method further comprising sonicating at least a portion of the nanotubes prior to contacting the first and second monomer mixtures.

8. The method of claim 1, wherein the nanotubes comprise one or more of single-wall carbon nanotubes, double-wall nanotubes, and multi-wall carbon nanotubes.

9. The method of claim 1, wherein the nanotubes comprise single-wall carbon nanotubes.

10. The method of claim 1, wherein the nanotubes comprise boron nitride nanotubes.

11. The method of claim 1 further comprising converting unfunctionalized nanotubes to functionalized nanotubes prior to the contacting, said functionalized nanotubes comprising functional groups covalently bonded thereon, wherein the nanotubes comprise the functionalized nanotubes, the method further comprising sonicating at least a portion of the functionalized nanotubes prior to contacting the first and second monomer mixtures.

12. The method of claim 11 wherein the step of converting comprises treating the unfunctionalized nanotubes to provide carboxylic acid chloride functional groups covalently bonded thereon, and subsequently forming amide bonds via reaction of at least a portion of the acid chloride functional groups with one or both of an aliphatic amine and an aryl-substituted aliphatic amine.

13. The method of claim 11 wherein the converting comprises covalently bonding a moiety comprising a dodecyl group to the unfunctionalized nanotubes.

14. The method of claim 11, wherein the converting comprises covalently bonding a moiety comprising an octadecyl group to the unfunctionalized nanotubes.

* * * * *